United States Patent [19]

Durand et al.

[11] Patent Number: 5,403,060
[45] Date of Patent: Apr. 4, 1995

[54] WEATHER SEAL FOR GLAZED SURFACE

[75] Inventors: Eric Durand, La Chapelle Sur Aveyron; Thierry Marché, Montargis, both of France

[73] Assignee: Hutchinson, Paris, France

[21] Appl. No.: 116,977

[22] Filed: Sep. 7, 1993

[30] Foreign Application Priority Data

Sep. 8, 1992 [FR] France .................. 92 10705

[51] Int. Cl.⁶ ............................................. B05B 1/10
[52] U.S. Cl. ............................... 296/93; 239/284.1
[58] Field of Search ................. 296/93; 239/284.1; 15/250.01

[56] References Cited

U.S. PATENT DOCUMENTS

| 3,414,317 | 12/1968 | Mortimer | 239/284.1 X |
| 4,212,425 | 7/1980 | Schlick | 239/284.1 X |
| 4,387,853 | 6/1983 | Sarai et al. | 239/284.1 |

FOREIGN PATENT DOCUMENTS

| 255218 | 2/1988 | European Pat. Off. | |
| 1919889 | 7/1965 | Germany | |
| 2210178 | 9/1973 | Germany | |
| 9201119 | 5/1992 | Germany | |
| 4331649 | 11/1992 | Japan | 239/284.1 |

*Primary Examiner*—Joseph Pape
*Attorney, Agent, or Firm*—Bell, Seltzer, Park & Gibson

[57] ABSTRACT

The invention relates mainly to a weather seal for a glazed surface, particularly for an automobile windshield, rear screen and weather strip. The object of the invention is a weather seal for a glazed surface, particularly for a windshield or rear screen of automobiles, which includes a pipeline (16) for supplying nozzles (9) with washing liquid. The invention is applied mainly to the windshields, to the rear screens of automobiles and/or weather strips, windshield moldings. The invention is also applied to any surface, advantageously a glazed surface, surrounded by a seal, preferably swept by windshield wipers, and particularly to the windshields of trucks, boats or ships, trains, airplanes and helicopters.

7 Claims, 2 Drawing Sheets

WEATHER SEAL FOR GLAZED SURFACE

The invention relates mainly to a weather seal for a glazed surface, particularly for an automobile windshield, rear screen and weather strip.

When driving an automobile, safety depends on visibility, particularly through the windshield and rear screen of the vehicle. This visibility may be compromised by deposits of dirt on the glazed surface, particularly by splashes of mud and by impact with insects. It has therefore become necessary to provide, on automobiles, windshield washers including nozzles supplied with washing liquid and spraying it onto the glazed surface swept by windshield wipers. The nozzles are usually arranged in an opening made in a piece of bodywork of the vehicle, particularly on the hood or directly on the windshield wipers.

The first solution of known type requires the bodywork to be pierced, and expensive precautions to be taken to prevent corrosion of the bodywork at the region of its openings.

In addition, this type of nozzle forms projections on the bodywork which compromise the esthetic appearance of the vehicle.

In the second solution, the mass of the moving equipment of the windshield wipers is unnecessarily increased.

In all cases, the connection of the nozzles to the device for supplying washing liquid is complex and delicate, which increases the manufacturing and servicing costs. The nozzles of a known type, in order to be effective, require frequent adjustment of their orientation.

It is consequently an object of the present invention to offer a device for spraying a liquid on to a surface, particularly a window washer, in which fitting and/or connection to a device for supplying liquid is simple.

It is also an object of the present invention to offer a window washer allowing a desired and predetermined distribution of the washing liquid over the glazed surface.

It is also an object of the present invention to offer a an automobile window washer exhibiting a modern esthetic appearance.

It is also an object of the present invention to offer a window washer giving great stability over time.

The main subject of the invention is a weather seal for a glazed surface, particularly for a windshield or rear screen of automobiles, which includes a pipeline for supplying nozzles with washing liquid.

The subject of the invention is also a weather seal, which includes overmolded nozzles.

The subject of the invention is also a weather seal, wherein the weather seal is extruded, and wherein the pipeline for supplying the nozzles with washing liquid is coextruded with the weather seal.

The subject of the invention is also a weather seal, which includes an element which can be deformed under the action of an aqueous washing liquid expanding as it freezes.

The subject of the invention is also a weather seal, which, in a non-fitted condition, has the overall shape of an L and which includes a recess forming, in the fitted condition, the pipeline for supplying the nozzles with washing liquid.

The subject of the invention is also a weather seal, which includes a first hook and a second hook and a wall of slight thickness forming a hinge allowing folding into a U when fitting the weather seal with the first hook clipping on to the second hook.

The subject of the invention is also a weather seal, which includes a groove for receiving a window.

The subject of the invention is also a weather seal, which includes a lip capable of being bonded on to the outer face of a windshield.

The subject of the invention is also a weather seal, which is produced as a single piece.

The subject of the invention is also a weather seal, which includes sides which are connected together by corner moldings providing continuity of the hydraulic circuit for supplying the nozzles.

The invention will be better understood by means of the description given hereafter and of the figures which are given as non-limiting examples and in which:

In FIGS. 2 to 7, the same references have been used to denote the same elements.

Figure 1:
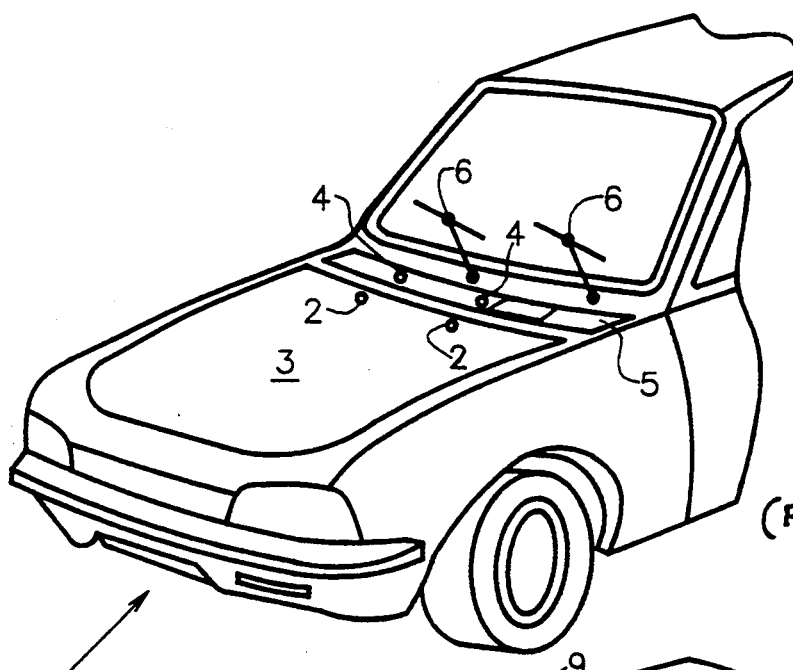
FIG. 1 is a partial perspective view of a vehicle including window washing devices of a known type.

In FIG. 1 a vehicle can be seen on which the various conventional positions of the nozzles of a windshield washer have been indicated by circles.

The nozzles 2 are arranged in openings made in the hood for the engine (not shown).

The nozzles 4 are arranged on a panel 5 of the scuttle grille.

The nozzles 6 are located on the windshield wipers.

Windshield washers of a known type are complicated to fit and the accuracy with which the washing liquid is sprayed deteriorates with time.

Figure 2:
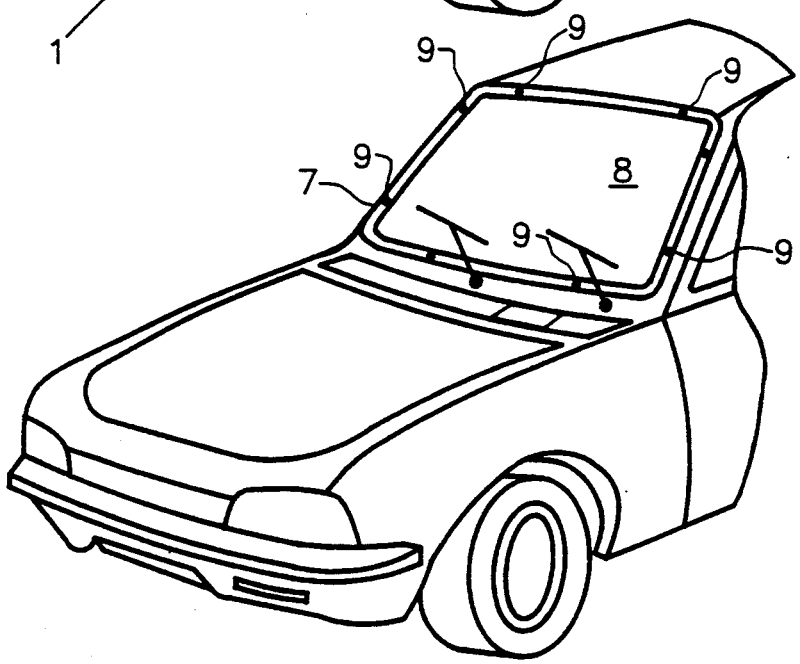
FIG. 2 is a partial perspective view of a vehicle equipped with a device according to the invention.

In FIG. 2 an automobile may be seen, which is equipped with one embodiment of a windshield washing device according to the invention, which is built into a weather seal 7 for a windshield 8. As a variant, the device according to the invention may be built into the molding of the windshield 8, into the peripheral weather strips of the window or into the windshield wiper strips.

In the example illustrated, two nozzles 9 are arranged on each of the four sides of the weather seal of the windshield. On the one hand, building the nozzles 9 into the weather seal ensures their position is fixed and can be made so that it is impossible to change their setting with respect to the windshield 8. On the other hand, it is possible to distribute, more or less evenly, a considerable number of nozzles, which improves the effectiveness of the washing.

The supply of washing liquid to the nozzles 9 is built into the weather seal 7. The fitting of the washing device on to the vehicle is thereby simplified and advantageously consists in connecting a quick connector of the weather seal 7 to the hydraulic circuit for supplying washing liquid, which usually includes a reservoir and a pump.

Figure 3:
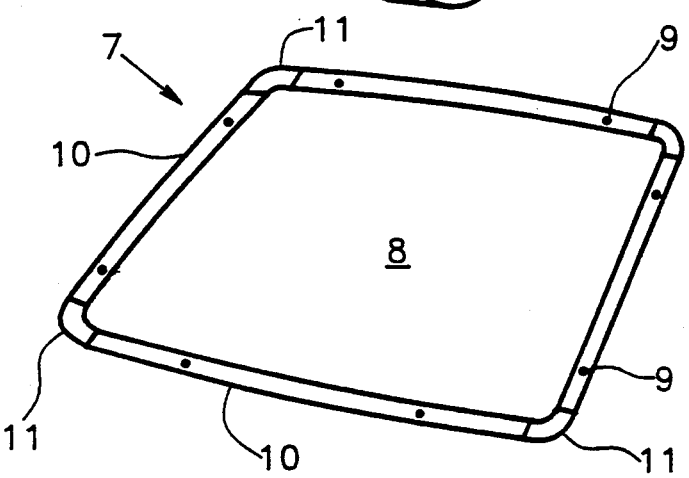
FIG. 3 is a perspective view of a windshield equipped with an variant embodiment of the device according to the present invention.

The weather seal 7 may be produced as a single piece surrounding the windshield, as illustrated in FIG. 2 or, in contrast, as illustrated in FIG. 3, it may include four sides 10 connected by corner moldings 11 providing the continuity of the hydraulic circuit for supplying the nozzles 9.

The various embodiments of the part of this hydraulic circuit which is inside the weather seal 7 are illustrated in FIGS. 4 to 7.

Figure 4:
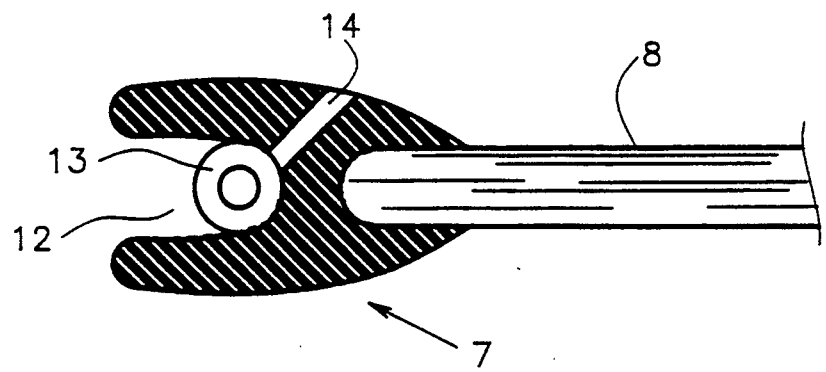
FIG. 4 is a diagrammatic sectional view of a first embodiment of the device according to the present invention.

In FIG. 4, a weather seal 7 can be seen including a groove 12 into which a pipeline 13, for example a tube, has been inserted. A channel 14 is made in the thickness of the weather seal 7 making it possible to supply a nozzle, not shown in FIG. 4, from the pipeline 13.

Figure 5:
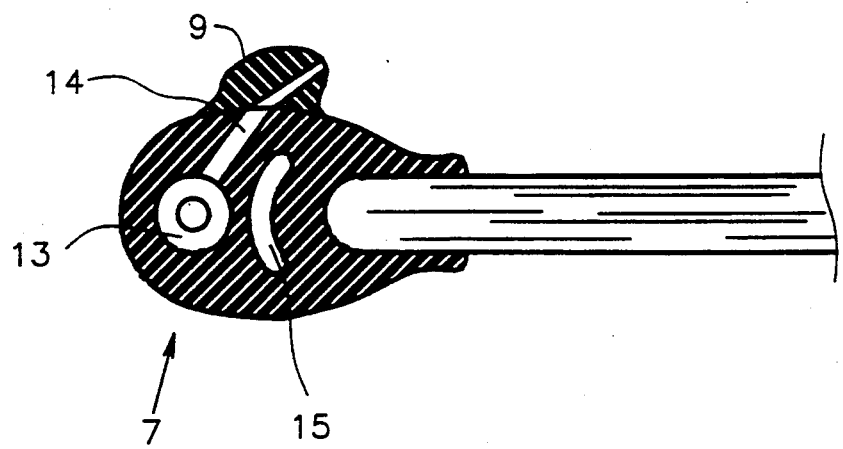
FIG. 5 is a diagrammatic sectional view of a second embodiment of the device according to the present invention.

In FIG. 5, a weather seal 7 can be seen in which a pipeline 13 has been incorporated, for example by extrusion or coextrusion. Advantageously the weather seal 7 includes a membrane or cavity 15 which can be deformed in order to prevent the pipeline 13 from bursting when an aqueous washing liquid freezes.

Figure 6:
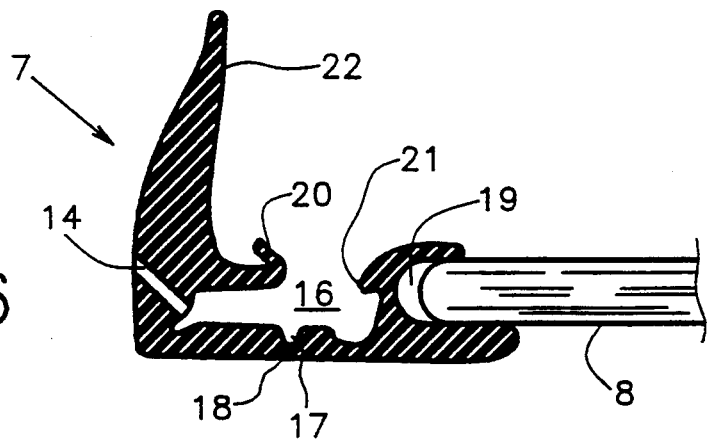
FIG. 6 is a sectional view of the preferred embodiment of the device according to the present invention during fitting.
Figure 7:
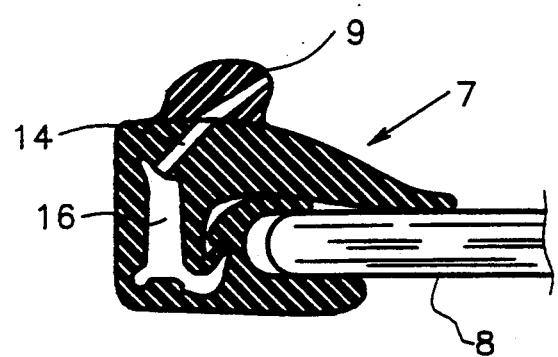
FIG. 7 is a sectional view of the device of FIG. 6 once it is fitted on a windshield.

In FIGS. 6 and 7 the preferred embodiment of a weather seal 7 according to the invention can be seen. The weather seal 7 is an L section such as illustrated in FIG. 6 including a recess 16 and means for locking in a configuration folded into a U about a groove 17, leaving one wall of slight thickness 18 which forms a hinge, as illustrated in FIG. 7, remaining. In the configuration folded over into a U, the recess 16 forms a pipeline for distributing cleaning fluid to the nozzles 9.

The preferred embodiment includes a groove 19 slipped over the edge of the windshield 8.

Locking means include a first hook 20 and a second hook 21.

Folding the weather seal 7 over around the groove 17 and the hinge 18 allows stable fastening of the hook 20 on to the hook 21. Advantageously, one lip 22 of the weather seal 7 is bonded on to the outer face of the windshield 8.

In a first variant embodiment of a weather seal 7 according to the invention, the nozzles 9 are arranged, at the factory, when the weather seal is produced, level with the channels 14 formed beforehand. For example, the nozzles 9 are overmolded onto the weather seal 7.

In a second variant embodiment of a weather seal 7 according to the invention, the nozzles 9 are arranged when fitting the vehicle, over channels 14 which are formed beforehand, and which are advantageously marked in order to facilitate identification thereof by a human operator and/or by a robot. For example, clips equipped with a nozzle are crimped on to the weather seal 7.

In a third variant embodiment of the weather seal according to the invention, the nozzles 9 are arranged when fitting the vehicle, with simultaneous formation of the channels 14.

For example, each nozzle, which is advantageously orientable, includes a needle, the tapered part of which pierces right through the weather seal 7 in order to reach the pipeline 13 or 16.

The weather seal 7 according to the invention may be produced from various materials, particularly from elastomer, from plastomer, from plastics, metal or composite materials.

The invention is applied mainly to the windshields, to the rear screens of automobiles and/or weather strips, windshield moldings.

The invention is also applied to any surface, advantageously a glazed surface, surrounded by a seal, preferably swept by windshield wipers, and particularly to the windshields of trucks, boats or ships, trains, aeroplanes and helicopters.

We claim:

1. A weather seal for a glazed surface of an automobile, said weather seal comprising a flexible body which in the unflexed uninstalled condition has an L-shaped cross section and includes a recess, and wherein said body, when installed on a glazed surface and flexed, includes a pipeline for receiving washing fluid defined by said recess, and a plurality of nozzles formed in said body in fluid communication with said pipeline and having discharge openings for discharge of washer fluid from the weather seal.

2. The weather seal as claimed in claim 1, which includes a first hook and a second hook and a wall of slight thickness forming a hinge allowing folding into a U with the first hook clipping on to the second hook.

3. The weather seal as claimed in claim 1, which includes a groove for receiving a window.

4. The weather seal as claimed in claim 1, which includes a lip capable of being bonded on to the outer face of a windshield.

5. The weather seal as claimed in claim 1, which is produced as a single piece.

6. The weather seal as claimed in claim 1, which includes sides which are connected together by corner moldings providing continuity of the pipeline for supplying the nozzles.

7. A weather seal for a glazed surface of an automobile, said weather seal comprising a body, means in said body defining pipeline for receiving washing fluid, a plurality of nozzles formed in said body in fluid communication with said pipeline and having discharge openings for discharge of washer fluid from the weather seal, and an element which can be deformed in response to an aqueous washing liquid expanding as it freezes.

* * * * *